(12) United States Patent
Sclalfani

(10) Patent No.: US 7,200,898 B2
(45) Date of Patent: Apr. 10, 2007

(54) CLAMPING SYSTEM FOR SAFETY LINES

(76) Inventor: Augustus Sclalfani, 25 Woodhull Pl., Northport, NY (US) 11768-2839

( * ) Notice: Subject to any disclaimer, the term of this patent is extended or adjusted under 35 U.S.C. 154(b) by 61 days.

(21) Appl. No.: 10/866,186

(22) Filed: Jun. 12, 2004

(65) Prior Publication Data
US 2005/0273982 A1     Dec. 15, 2005

(51) Int. Cl.
   *F16G 11/00*     (2006.01)
(52) U.S. Cl. .................. 24/115 R; 24/128; 24/135 R
(58) Field of Classification Search .............. 24/115 R, 24/128, 135 R; 248/342; 182/151; 441/84; 403/187, 189, 192, 238, 199–200, 300, 301, 403/305–308
See application file for complete search history.

(56) References Cited

U.S. PATENT DOCUMENTS

| | | | |
|---|---|---|---|
| 997,488 A * | 7/1911 | Campbell | 403/300 |
| 1,052,551 A * | 2/1913 | Zeller | 24/712.4 |
| 2,465,064 A * | 3/1949 | Colosimo | 43/42.09 |
| 4,028,488 A | 6/1977 | McDougall | |
| 4,043,690 A * | 8/1977 | Browne | 403/268 |
| 4,065,221 A | 12/1977 | Cawthorne | |
| 4,081,219 A * | 3/1978 | Dykmans | 403/43 |
| 4,140,207 A | 2/1979 | Sharp et al. | |
| 4,283,154 A | 8/1981 | Shepherd | |
| 4,489,828 A * | 12/1984 | Stipdonk | 198/847 |
| 4,815,408 A | 3/1989 | Burd | |
| 4,917,039 A | 4/1990 | Siero | |
| 4,941,281 A | 7/1990 | Vitale et al. | |
| 5,004,275 A | 4/1991 | Miller | |
| 5,233,320 A | 8/1993 | Evans | |
| 5,466,082 A | 11/1995 | Sherar | |
| 5,481,888 A | 1/1996 | Perry | |
| 5,593,327 A | 1/1997 | Hlinsky et al. | |
| 5,707,086 A | 1/1998 | Treu et al. | |
| 5,769,475 A | 6/1998 | Tylaska | |
| 5,863,020 A | 1/1999 | Olson et al. | |
| 5,931,708 A | 8/1999 | Annas et al. | |
| 6,010,099 A | 1/2000 | Wertz et al. | |
| 6,205,623 B1 | 3/2001 | Shepard et al. | |
| 6,260,498 B1 | 7/2001 | Cochran | |
| 6,390,721 B1 | 5/2002 | Wilson, II et al. | |
| 6,431,502 B1 | 8/2002 | Goodman | |
| 6,530,451 B2 | 3/2003 | Noselli | |
| 6,602,016 B2 | 8/2003 | Eckart et al. | |
| 6,672,774 B2 | 1/2004 | Theuerkorn et al. | |
| 2001/0046821 A1 * | 11/2001 | Stimpson et al. | 441/84 |

\* cited by examiner

*Primary Examiner*—James R. Brittain
(74) *Attorney, Agent, or Firm*—Law Office of Leo. G. Lenna

(57) ABSTRACT

The present application is directed to a clamping system for preparing safely lifelines used in recreational and professional sports such as sailing that requires minimum skills to install, easy to store and highly dependable. The present application is also directed to a compact kit having synthetic lines and attachment clamps that can be used to replace a lifeline on a sailboat without splicing or using heavy machinery.

7 Claims, 11 Drawing Sheets

CLAMPING SYSTEM FOR SAFETY LINES

FIELD OF THE INVENTION

The present invention relates to the field of sailing safety equipment that is easy to install, easy to store and highly dependable. In particular, the present invention is directed to a lifeline attachment clasp and kit for sailing, rock climbing, and any other sport of job that requires working high above the ground.

BACKGROUND OF THE INVENTION

Many sports or recreational activities require some sort of safety gear such as helmets, fire retardant suits, knee pads, life vests, safety harnesses and lifelines just to name a few. In the eyes of a sailor, no safety gear is more important than a safety harness and a lifeline. In a worst-case scenario, they can mean the difference between life and death. Although they are clearly acknowledged by most sailors as very important, they are also often used as weather-cloth attachment points, as lashing arms for an array of gear, and by dockside hands trying to stop a boat that's coming alongside. Until they're really needed, lifelines are generally abused and taken for granted.

In any onboard lifeline system made up of many components, one weak link can precipitate a major failure. Because many lifeline fittings are shackled, pinned, screwed, or even lashed together, it takes only one "undoing" to spell disaster. Wear and tear takes their toll, so it's vital each part is appropriately sized and regularly inspected. In fact, a prudent thing to do would be to replace the lifeline and to keep a spare lifeline system on board so if the existing lifeline shows signs of weakness during a sail it can be easily and safely replaced. On the systems available on the market today this is easier said than done.

Many sailors simply do not replace lifelines on a regular basis since it is costly, cumbersome and requires special equipment to either splice the stainless steel wire or attach fittings at the end of the stainless steel wire using a high pressure-fitting machine. For these reasons as well as the large quantity of storage space required to store many feet of spare stainless steel wire to replace a compromised safety line should it break during a long distance sail is why sailors do not routinely replace lifelines on a regular basis or keep spare stainless wire on board.

In view of the foregoing, what is needed on the market today is a lifeline that has strength, can be easily stored and one in which clasps, clamps and other hardware can easily and soundly be attached to the lifeline. The present invention fulfills the market need described above. The present invention provides a kit that uses state of the art synthetic lines and attaching hardware that makes changing lifelines, fast, easy and foolproof. The present invention does not require splicing stainless steel wire, nor does it require high pressure clasping equipment. Instead, a new lifeline can be facilitated quickly and easily, yet provides as much structural integrity as conventional stainless steel safety lines that require qualified professionals and equipment to install them properly. Therefore, the present invention meets a need present in the market today.

SUMMARY OF THE INVENTION

The present invention is directed to a safety line-clamping device, a method of securing a safety line and a kit comprising a safety line clamping device and safety line.

The safety line-clamping device of the present invention comprises a male fitting having first and second terminals 180 degrees opposed to one another. The first and second terminals of the safety line-clamping device of the present invention contain a bore connected by a hollow core. The safety line-clamping device of the present invention also includes a locking fitting sized so as to lock in place within the hollow core. In one embodiment of the present invention, the locking fitting has threads and the hollow core has threads that are configured to accept the threads of the locking fitting. Once the locking fitting is screwed in place the line captured beneath the locking fitting is secured. The safety line-clamping device of the present invention also includes a female fitting configured to fit over the male fitting to form a single unit.

In one embodiment of the present invention, the female fitting and the male fitting both contain threads. The threads on the female fitting are configured to accept the threads on the male fitting so as to lock the two fittings together as one unit once screwed together. The male fitting, the female fitting and the locking fitting are constructed of material selected form the group consisting of stainless steel, metal alloy, composite, and synthetic high strength material.

In one embodiment of the present invention, the female fitting has an open end and a closed end; the closed end terminates with a threaded shaft. The threaded shaft can be of different sizes and allows for the attachment of standard lifeline fittings available at local marine stores or online.

Another embodiment of the present invention is directed to a method of constructing a safety line by inserting a line through the hollow core of a male fitting having first and second terminals that are 180 degrees wherein the line positioned through the hollow core of the male fitting extends out of one of the terminals of the male fitting. Once the line is threaded, the line is used to make a knot, preferably a double or figure eight-knot. The line with the knot extending out of the male fitting is pulled into the hollow core of the male fitting to produce a male fitting with a knotted line in its hollow core.

Once the knot is pulled into the hollow core, a locking fitting is inserted into the second terminal of the male fitting and the locking fitting is tightened to produce a male fitting with a knotted line locked in place by the aforementioned locking fitting. With the knotted line locked in place by the locking fitting, the female fitting is threaded on to the male fitting to produce a continuous structure comprising a knotted line locked into the male fitting with a female fitting threaded over the male fitting.

Another embodiment of the present invention is directed to a safety line replacement kit that contains a safety line, a male fitting comprising a first terminus having an opening and a second terminus having an opening wherein the second terminus is positioned at the opposing end of the first terminus. The first and second terminal openings being connected by a hollow core. The kit also includes a locking fitting sized so as to lock in place within the hollow core of the second terminus of the male fitting and a female fitting configured to fit over the male fitting to form a single unit.

One embodiment of the present invention is directed to a kit that includes line that has a breaking strength point of at least 1500 pounds tensile strength, such as line having the trade name Spectra® fiber. Spectra® fiber is one of the world's strongest and lightest fibers, is a premier material for a variety of rope and cordage products including marine lines, utility and rescue lines, commercial fishing nets, slings and industrial cordage. Products made from Spectra® fiber are widely used around the world for heavy marine and offshore applications, as well as for yachting, boating and recreational climbing.

DETAILED DESCRIPTION OF THE INVENTION

Figure 9:
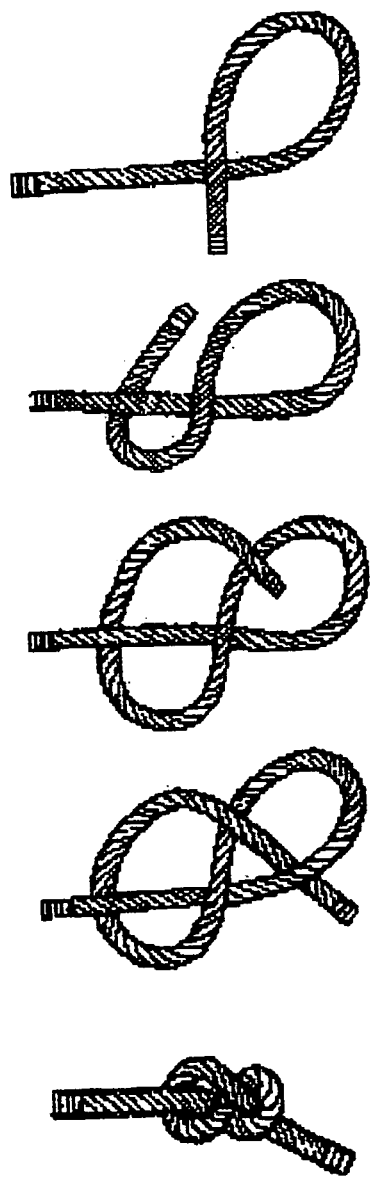
Figure 10:
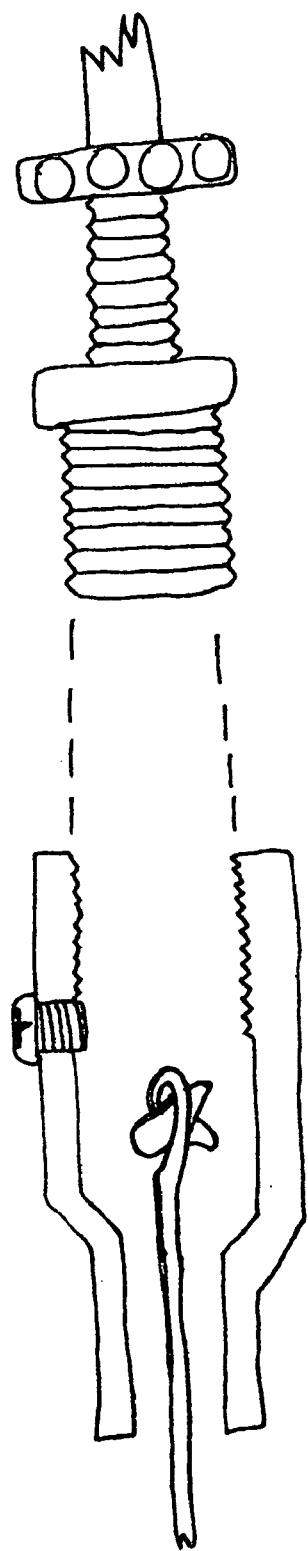
Figure 11:
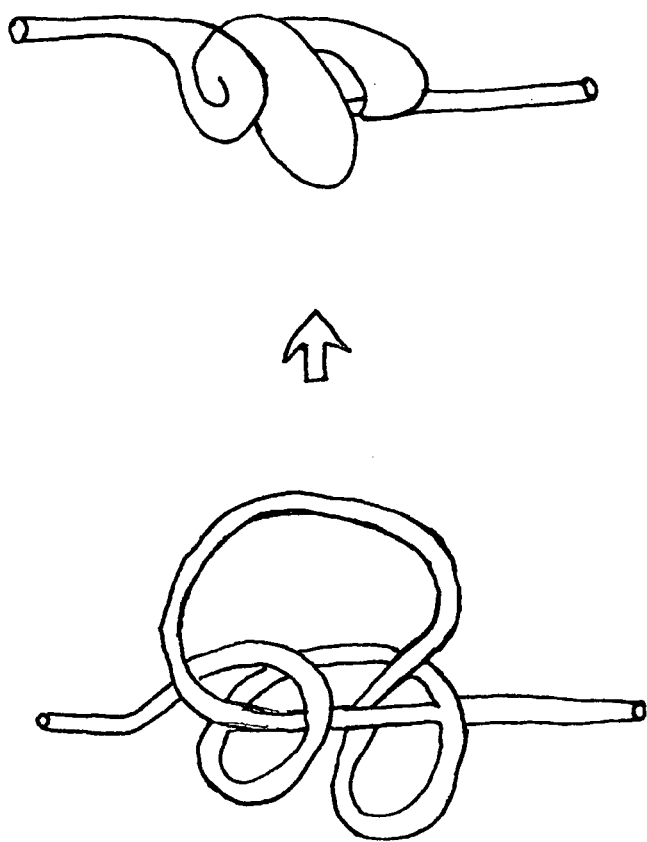

FIG. 9 shows the configuration of the eight knot.
FIG. 10 shows a complete assembly comprising the male and female portions of the invention.
FIG. 11 shows another type of knot that can be used with the invention called a double wrap stop knot.

The expanded portion of the hollow shaft (100) containing a non-threaded outside wall (50) and an internal wall that contains screw threads (60) positioned approximately half the way between each end of the male device on the internal wall. This threaded portion of the male portion of the device is continuous with an expanded non-threaded portion of the hollow shaft (120). In other words, the male portion of the device (10) has a hollow elongated cavity in the form of a shaft that originates as a non-threaded narrow hollow shaft, widens into a shaft that contains threads on the internal wall of the elongated hollow shaft and terminates with an expanded portion of the hollow shaft (70) that contains threads (80) on the outside wall of the hollow shaft.

The male portion of the device also contains a one-way locking screw (90) configured to fit directly into the screw threads (60) positioned approximately half the way between each end of the male device. The locking screw is designed to hold the knotted line in place once set into position.

Figure 1:
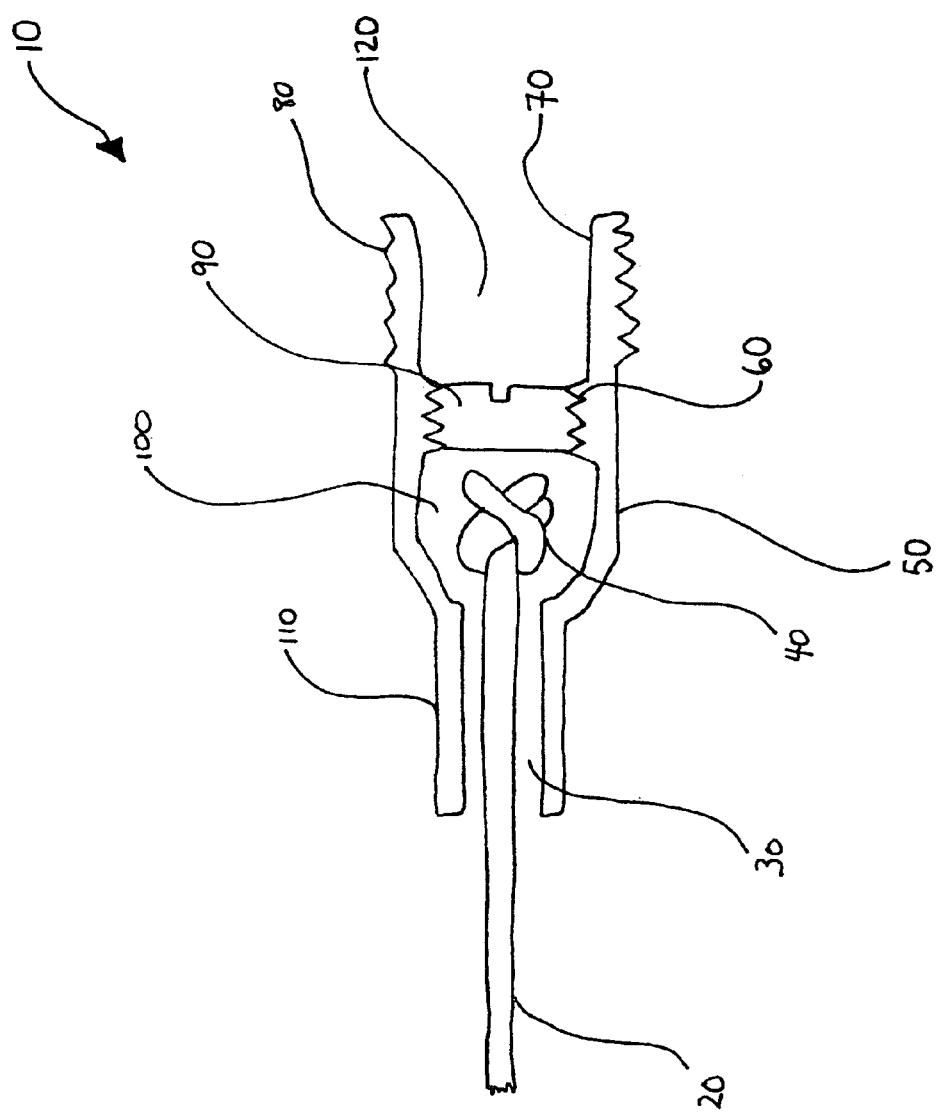
FIG. 1 shows a cross section of one embodiment of the male portion of the clamping device of the present invention.
(10) male portion of clamping device
(20) line
(30) tapered hollow shaft
(40) knot
(50) outside wall of expanded portion of hollow shaft
(60) inside threads
(70) inside wall of expanded portion of hollow shaft
(80) outside threads
(90) one-way locking screw
(100) expanded portion of hollow shaft
(110) tapered section of clamping device
(120) expanded non-threaded
Figure 2:
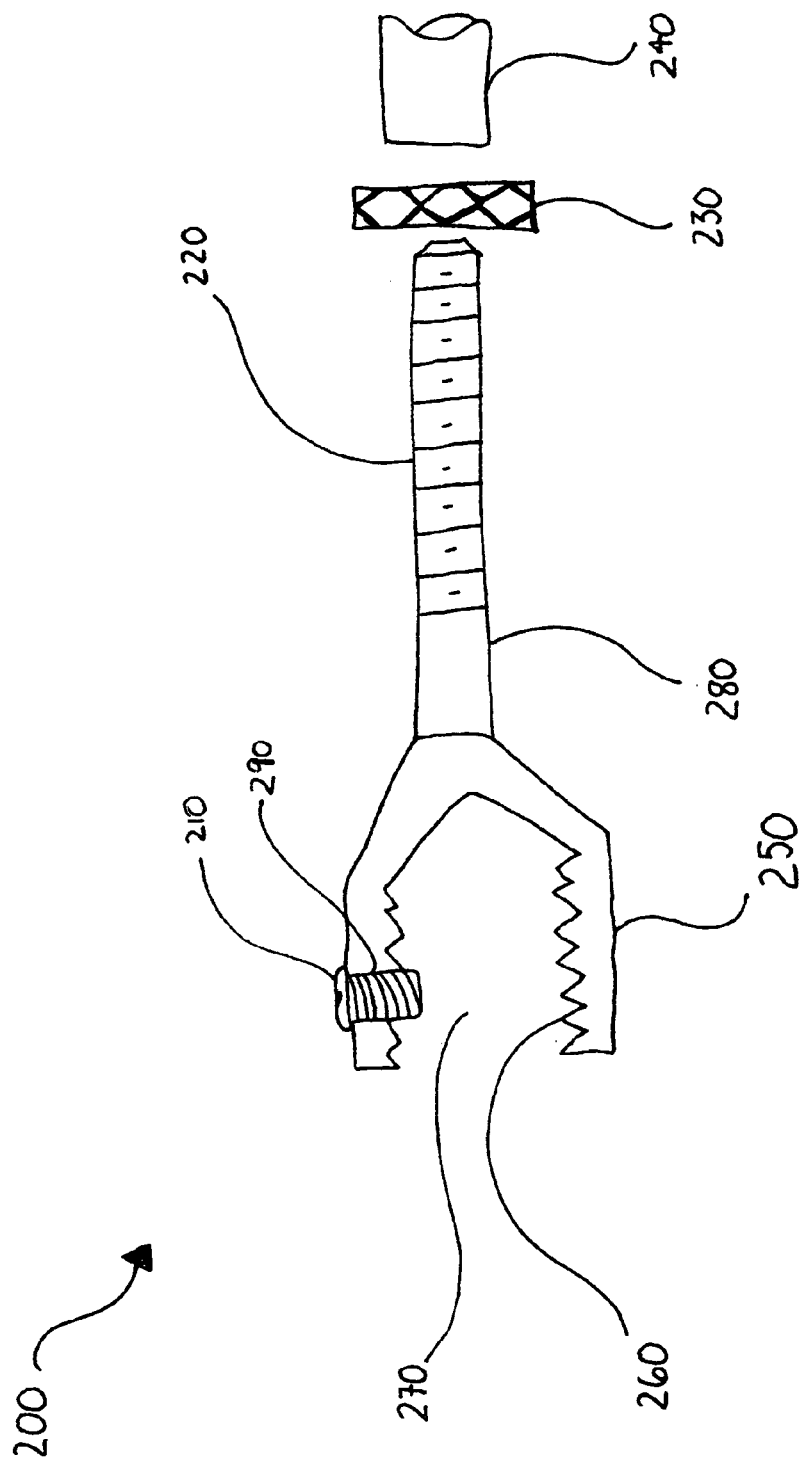
FIG. 2 shows a cross section of the female portion of the clamping device (200) of the present invention.
(200) female portion of clamping device
(210) locking set screw
(220) threaded portion of shaft
(230) locking nut
(240) standard fitting
(250) outside portion of threaded cavity
(260) inside threads
(270) threaded cavity
(280) threaded shaft
(290) locking screw

The clamping device of the present invention also comprises a female portion. FIG. 2 shows a cross section of the female portion of the clamping device (200) of the present invention. The female portion (200) comprises a threaded shaft (280) at one end of the device and an open cavity (270) having inside threads (260) at the other end. The diameter of the threaded cavity (270) of the female portion of the device is greater than the diameter of the expanded portion of the male portion of the device having outside threads (see FIG. 1). This configuration permits the female portion (200) of the present invention to thread onto the male portion (10) of the present invention to produce a single unit.

The outside surface of the threaded cavity (250) of the female portion of the present invention has a locking screw hole (290) in which a locking set screw (210) threads into. The locking screw hole (290) spans from the outside surface of the threaded cavity (250) to the inside surface of the threaded cavity (270). In one embodiment of the present invention, the locking setscrew can be used to secure the female portion of the device to the male portion of the device by threading the female portion onto the male portion of the present invention so as to provide additional unit integrity.

As stated above, the opposite end of the female portion of the clamping device has a shaft (280) containing threads (220). The threads (220) can be of different sizes depending on the application of the device. FIG. 2 also shows a standard fitting (240) and a locking nut (230) that will change according to what the clamping device of the present invention is being used for. For example, if the clamping device of the present invention is being used in conjunction with a safety lifeline on a sailboat the fittings may be one size and if the device is being used in conjunction with a construction workers safety harness the fittings size may be a different size.

Figure 3:
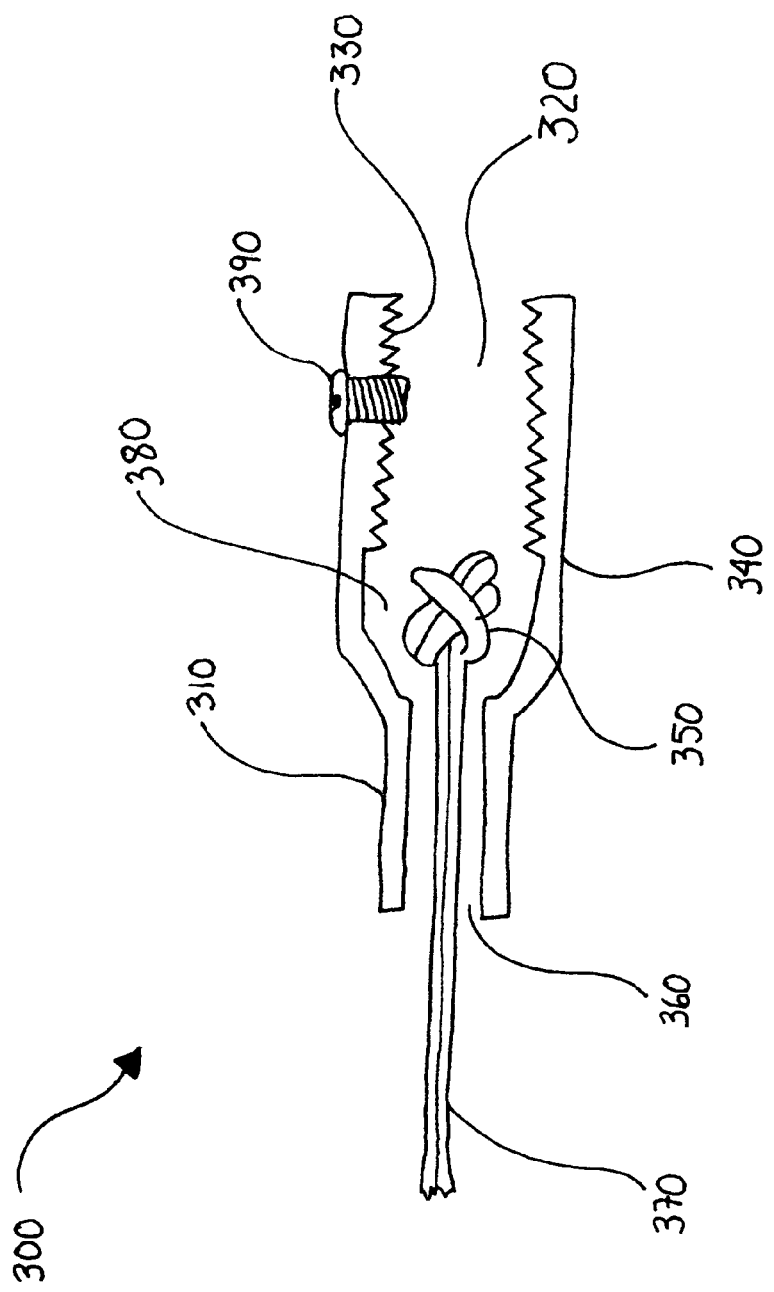
FIG. 3 shows a cross section of the female portion (300) of another embodiment of the clamping device of the present invention.
(300) female portion of clamping device
(310) tapered section of clamping device
(320) expanded threaded portion
(330) inside threads
(340) outside wall of cavity
(350) knot
(360) outside wall of tapered hollow shaft
(370) line
(380) non-threaded cavity
(390) one-way locking screw

FIG. 3 shows a cross section of the female portion (300) of another embodiment of the clamping device of the present invention. The female portion (300) has a non-threaded tapered section (310) and an expanded threaded portion (340). The female portion (300) also has a hollow cavity that spans from one end (360) of the device to the opposite end (320) of the female portion (300) of the device. The hallow cavity (320) of the expanded portion (320) contains threads (330) on the inside surface of the cavity. The threads (330) extend into the expanded portion (320) of the device and end prior to the tapered section of the device.

The outside wall of the expanded threaded portion (340) contains a one-way locking screw (390) that when threaded down into the expanded threaded portion (320) of the device onto the complimentary male portion of the clamping device of the invention the screw secures the two sections together as one unit. The line (370) can be threaded into the tapered section of the clamping device (310) and pushed out of the expanded threaded portion (320) and tied into a knot (350). The knot (350) can be pulled back into the extended cavity (320) and the complimentary male portion of the clamping device (shown in FIG. 4) can be threaded down onto the knot (350) so as to secure it in place. The setscrew can be screwed down so as to lock the two sections together as one unit.

Figure 4:
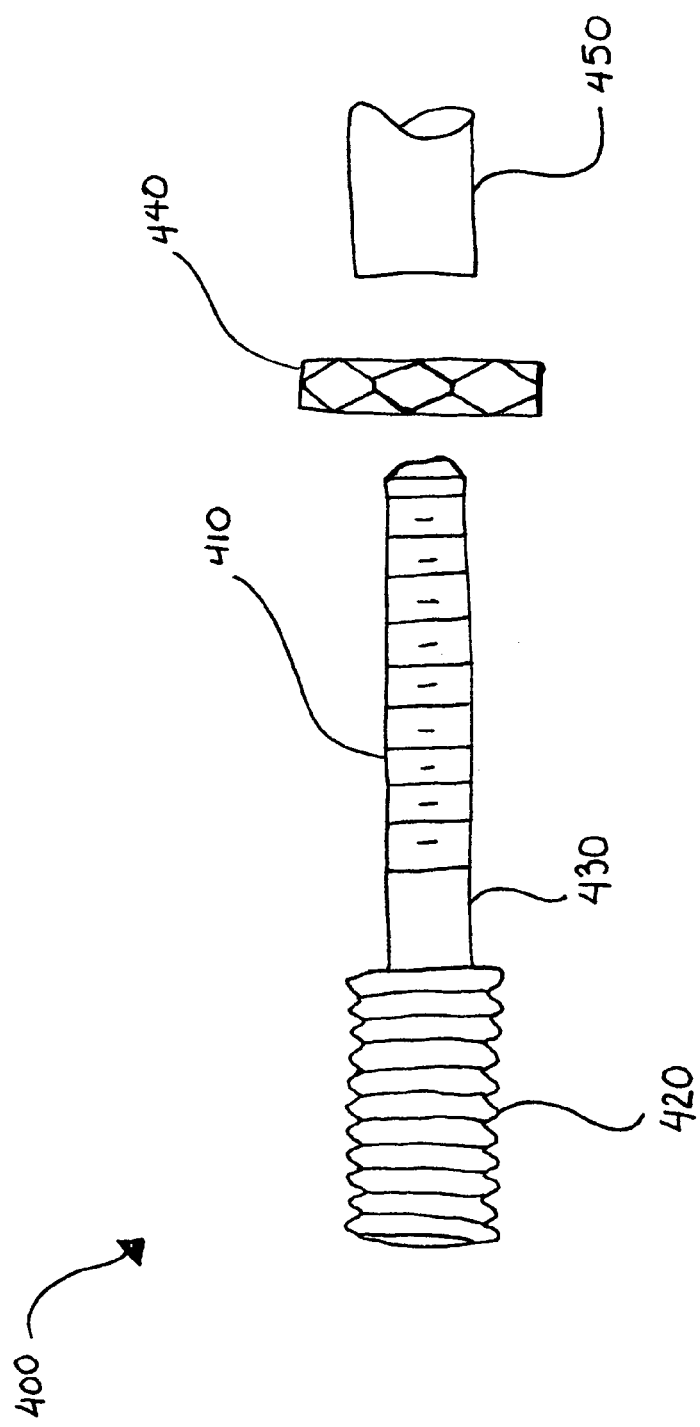
FIG. 4 shows a cross section of the male portion of the clamping device.
(400) male portion of clamping device
(410) threaded portion of shaft
(420) threads
(430) threaded shaft
(440) locking nut
(450) standard fittings

FIG. 4 shows a cross section of the male portion of the clamping device (400) of the present invention. The male portion of the clamping device (400) comprises two threaded ends. The first end having threads (420) that are complimentary to the threads on the female portion of the clamping device shown in FIG. 3. The opposite end comprises a shaft (430) having a threaded portion (410). As stated above in an earlier described embodiment of the invention, FIG. 2 also shows a standard fitting (450) and a locking nut (440) that may change according to what the clamping device of the present invention is being used for. For example as stated above, if the clamping device of the present invention is being used in conjunction with a safety lifeline on a sailboat the fittings may be one size and if the device was being used in conjunction with a stunt mans safety harness the fittings may be a different size.

Figure 5:
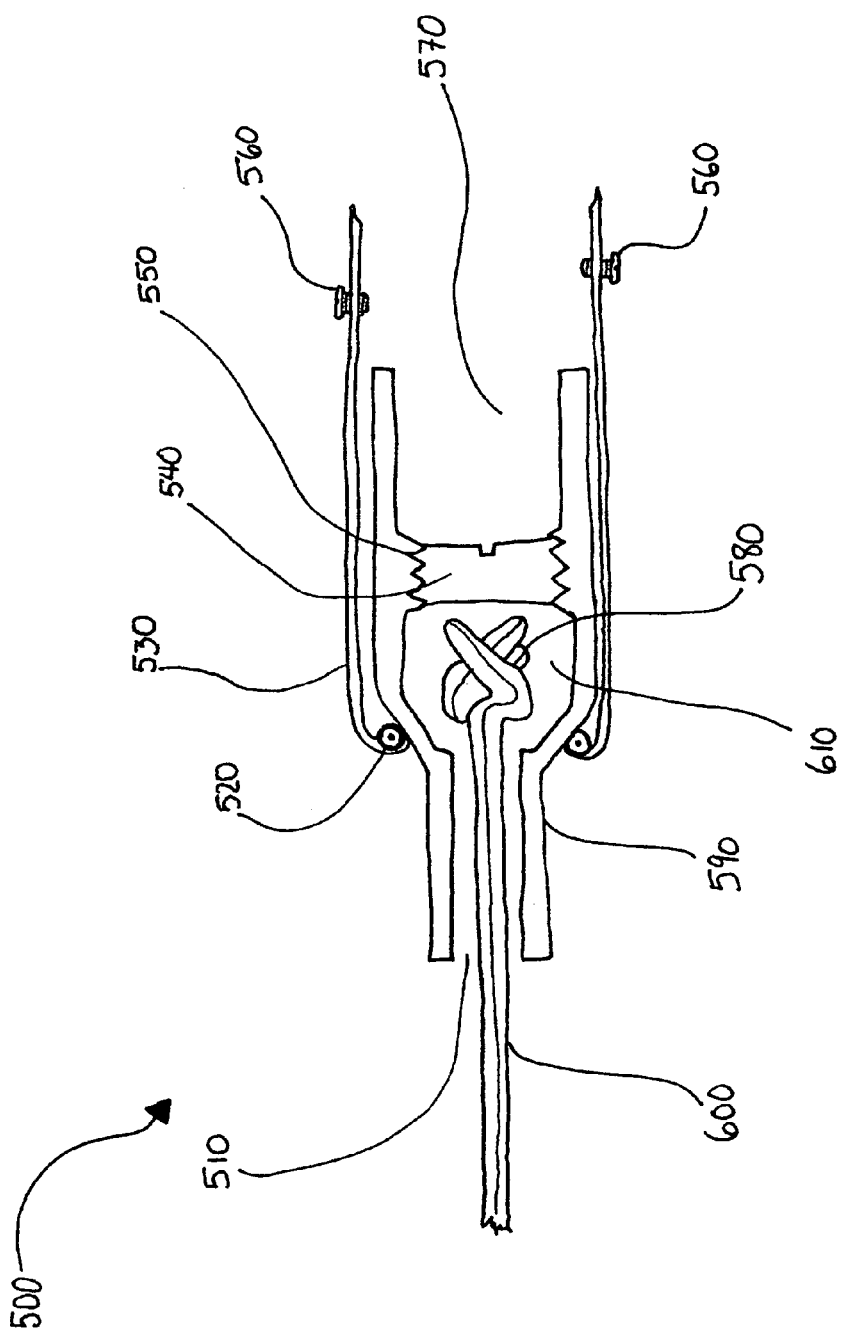
FIG. 5 shows a cross section of another embodiment of the clamping device (500) of the invention.
(500) female portion of clamping device
(510) tapered hollow shaft
(520) hinge
(530) locking pin
(540) one-way locking screw
(550) inside threads
(560) one-way locking hinge screws
(570) expanded non-threaded portion
(580) knot
(590) tapered section of clamping device
(600) line
(610) expanded portion of hollow shaft

FIG. 5 shows a cross section of another embodiment of the clamping device (500) of the invention. This embodiment contains most of the features of the female portion of the clamping device shown in FIG. 3 including a tapered hollow shaft (510), an expanded portion of the hollow shaft (610), a one-way locking screw (540) that fits into the insides threads (550) of the expanded portion of the hollow cavity, and a non-threaded expanded section located at the opposite end of the tapered hollow shaft. In addition, this embodiment contains a line (600) that terminates inside the expanded cavity as a knot (580). This embodiment differs from the earlier described embodiments in the mechanism used to secure the male section to the female section of the device.

This embodiment of the present invention contains two hinges (520) each of which secures one locking pin (530) to the outside portion of the clamping device (500). Each locking pin (530) extends past the end of the expanded non-threaded portion (570) of the clamping device so that the hinges come into contact with the male portion (shown in FIG. 6) of the locking device once inserted into the female portion. At the end of the locking pins (530) are one-way locking hinge screws (560) that secure the locking pin to the male portion of the clamping device to assure integrity of the unit.

Figure 6:
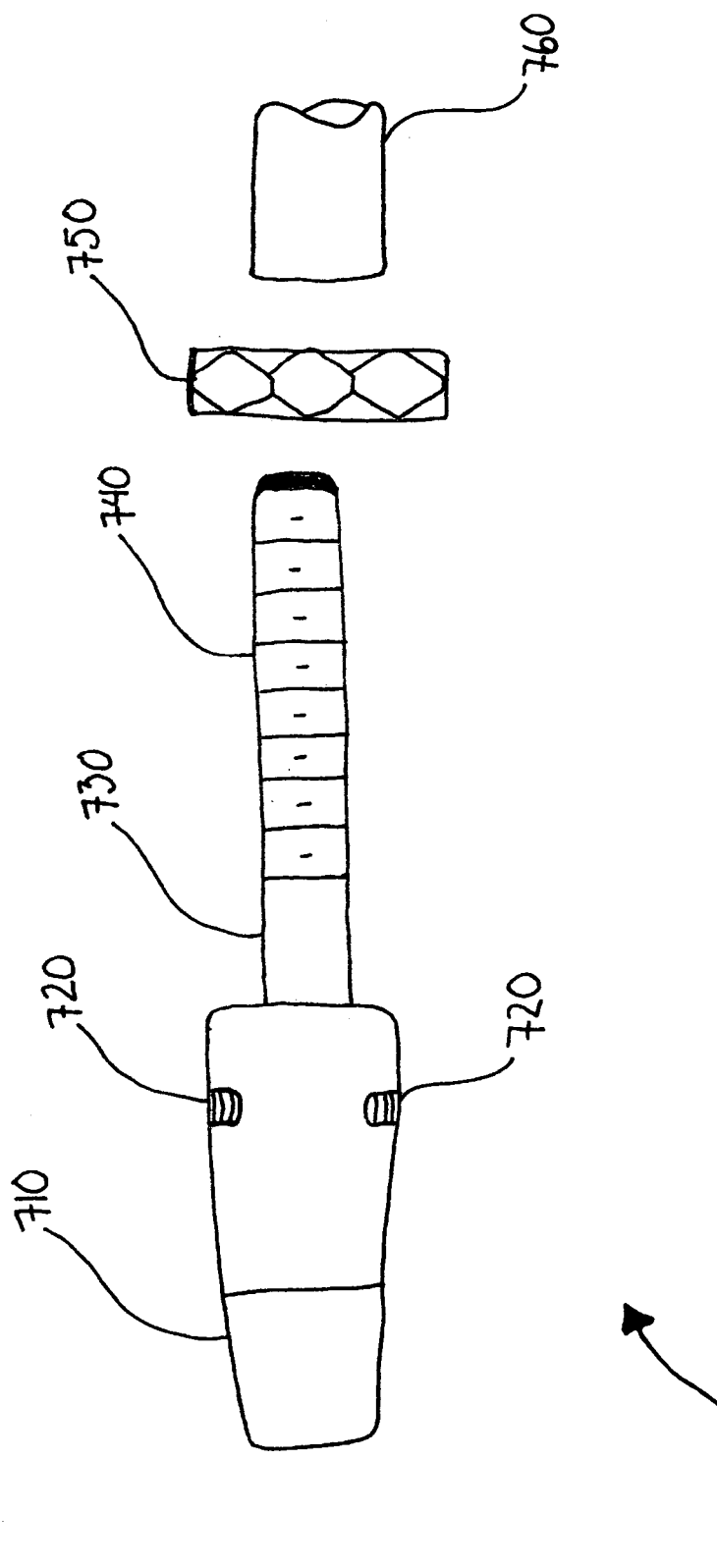
FIG. 6 shows a cross-section of a male portion of the clamping device of the present invention (700).
(700) male portion of clamping device
(710) tapered shaft
(720) threaded screw hole
(730) threaded shaft
(740) threaded portion of shaft
(750) locking nut
(760) standard fitting

FIG. 6 shows a cross-section of a male portion of the clamping device of the present invention (700). As stated with the female portion of this embodiment above, the male portion contains most of the features of the male portion of the clamping device shown in FIG. 3 including a threaded shaft (730) having a threaded portion (740) as well as standard fitting (760) and a locking nut (750). In addition, this embodiment of the male portion of the clamping device contains a tapered shaft (710) configured to fit into the female device show in FIG. 5. The tapered shaft also contains threaded screw holes configured to accept the one-way locking hinge screws shown in FIG. 5.

Once the male portion of the locking device (700) is inserted into the female portion shown in FIG. 5, the screws of the locking hinges are screwed into the locking screw holes (720) and the unit is secure together. With a knotted line inside the cavity of the female portion of the clamping device, the device can be used as a safety-line on a sailboat or for some other application.

For all of the embodiments described above the male and female portions of the clamping device are constructed from material that is capable of withstanding high stress, tension, and force associated with life-line applications such as vinyl coated steel, stainless steel, composites and the like. The line used must also be able to withstand at least 1500 pounds of force per square inch and may be selected from the group consisting of Spectra®, Firewire®, monofilament line, and the like. The fittings can be produced as a single cast, machine part, forged materials, composite materials, or any type of new-age materials that meet the criteria listed above.

Figure 7:
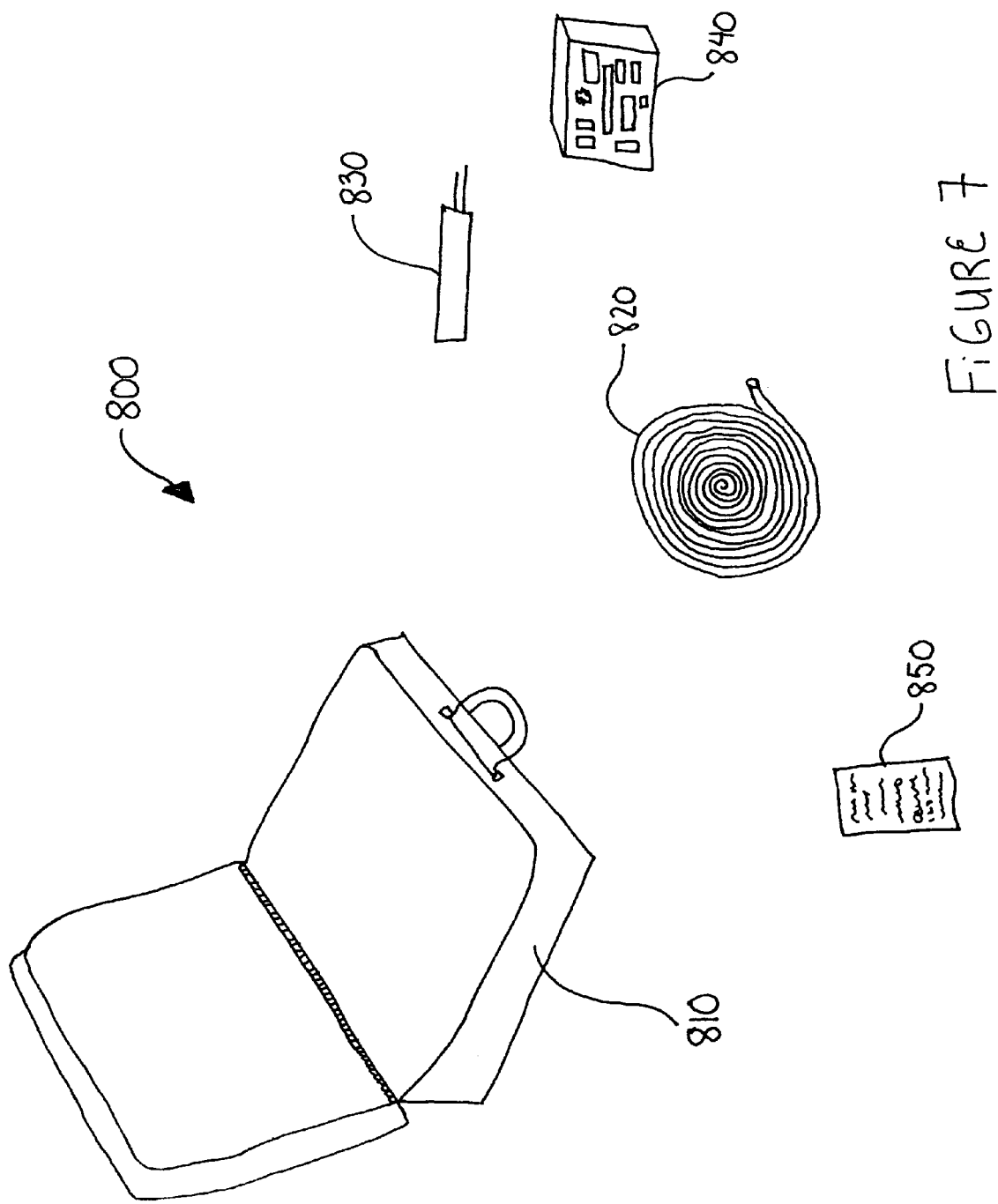
FIG. 7 shows a kit (800) comprising all of the elements of the present invention necessary to change a safety-line quickly and easily without the use of large expensive tools.
(800) safety line kit
(810) case
(820) line
(830) safety line clamping device of present invention
(840) assortment of standard fittings
(850) instructions

FIG. 7 shows a kit (800) comprising all of the elements of the present invention necessary to change a safety-line quickly and easily without the use of large expensive tools. The kit can be easily stored in the stow-away space of a sailboat to be used in case a safety-line breaks at sea. The kit (800) contains a carrying case designed to fit the elements needed to restring a safety line (810), a spool of high strength line (820), a safety line clamping device of present invention (830), an assortment of standard fitting and locking nuts (840) as well as a set of instructions on how to use the device (850). The kit may also include clip on vinyl covers or split vinyl cable covers for the safety line that protects the line form UV-rays, provides enhanced grip and gives a presentable appearance.

Figure 8:
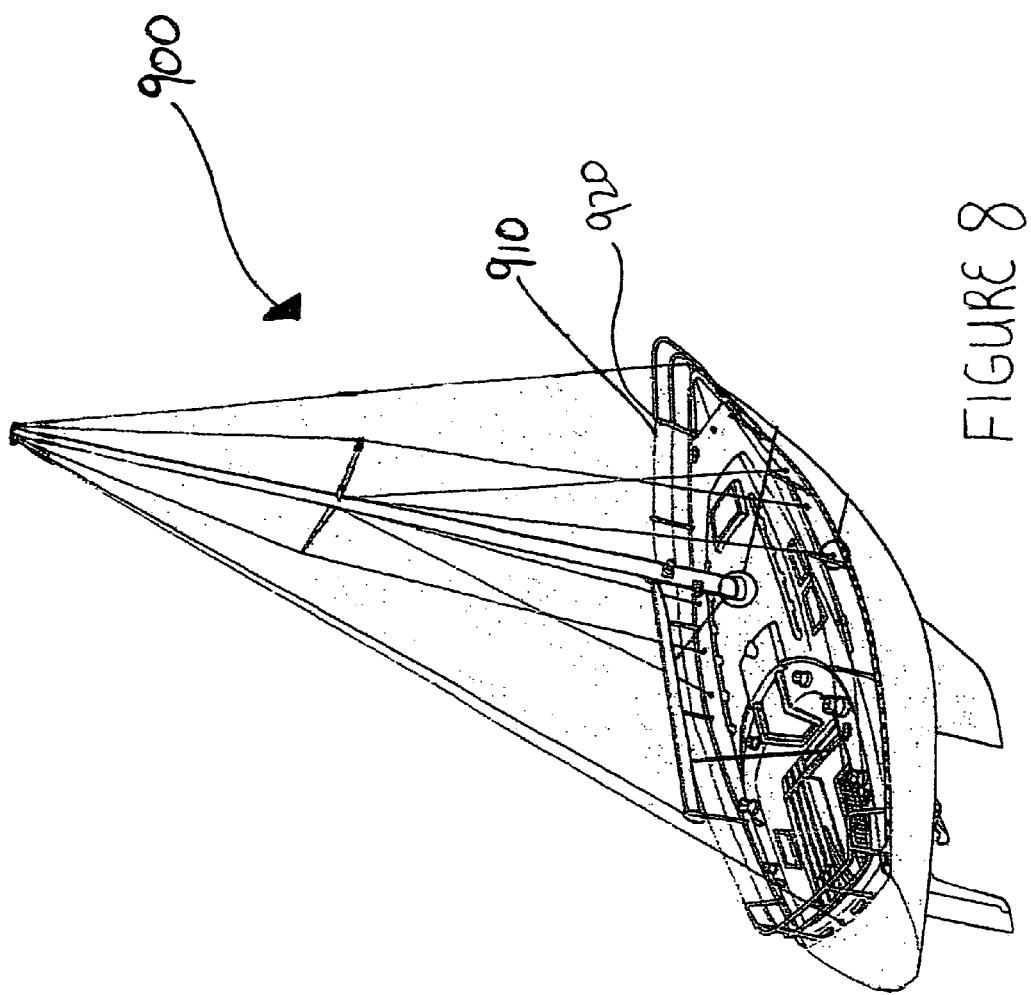
FIG. 8 shows the convention configuration of a sail boat.
(900) sailboat
(910) safety line
(920) stanchions

The kit can be used to replace the safety-line (920) threaded through the stanchion (910) of the sailboat (900) shown in FIG. 8.

FIG. 9 shows how a figure eight knot is produced. The figure eight knot (also known as the Flemish Knot or Savoy Knot) is larger, easier to produce and stronger than the overhand knot. Sailors favor this not for permanent small stopper. The figure eight knot shown is for demonstration purposes only and is just one of the many knots that can be used in the present invention.

FIG. 10 shows a complete assembly comprising the male and female portions of the invention. This is one embodiment of the assembly and other embodiments using the described male and female parts of the invention are possible and are considered part of the present invention.

FIG. 11 shows another type of knot that can be used with the invention called a double wrap stop knot. Other knots that have not been illustrated can be used with the present invention. Knots that do not slip are preferred.

The invention is also directed to a method of restringing a safety-line on a sailboat using the clamping device of the present invention. First the old safety-line should be removed. Then a new safety-line can be threaded through the stanchions on the sailboat leaving excess line to be used in the clamping device of the present invention. One end of the safety-line is treaded into the narrow portion of one of the clamps of the present invention described above. The line is then pushed through the cavity and tied into a knot, such as a figure eight-knot, double knot or similar knots that can permanently secure lines into fittings. The knot is then pulled into the cavity of the clamping device and either the locking screw is put in place to secure the knot or the male portion of the clamping device is screwed in place to secure the knot in place.

Once the unit is attached and secured as one unit, the standard fitting and locking nuts can be used to complete the safety-line. The new safety-line is now in place without splicing or using heavy machinery. The method described above will vary slightly according to where the safety-line is used and which embodiment of the present invention is used.

While the invention has been illustrated and described with respect to specific illustrative embodiments and modes of practice, it will be apparent to those skilled in the art that various modifications and improvements may be made without departing from the scope and spirit of the invention. Accordingly, the invention is not to be limited by the illustrative embodiment and modes of practice.

What is claimed is:

1. A safety line clamping device comprising:
   a male fitting comprising a first terminus having an opening and a second terminus having an opening, said second terminus positioned at the opposing end of said male fitting opposite said first terminus, said first and second terminus openings being connected by a hollow core;
   said male fitting further comprising threads on the outside of said second terminus and on said hollow core surface of said second terminus;
   a locking fitting comprising threads configured to fit in said threads on the hollow core surface of said second terminus to form a single unit; and
   a female fitting comprising threads on the inside of said female fitting whereby the threads of the female fitting are configured to fit over said threads of said male fitting to form a single unit, said female fitting comprising an open end and a closed end, said closed end continuous with a threaded shaft; and
   said female fitting further comprising a locking pin hole configured to accept a locking pin whereby locking said female fitting to said male fitting when said locking pin is inserted, said locking pin hole of said female fitting and said locking pin being threaded so as to screw into said locking pin hole and lock said female fitting to said male fitting upon tightening.

2. The safety line-clamping device according to claim 1 wherein said first tenninus of said male fitting is narrower than said second terminus.

3. The safety line clamping device according to claim 2 wherein said male fitting, said female fitting and said locking fitting is constructed of material selected form the group consisting of stainless steel, metal alloy, composite and synthetic high strength material.

4. A safety line replacement kit comprising:
   line;
   a male fitting comprising a first terminus having an opening and a second terminus having an opening, said second terminus positioned at the opposing end of said male fitting opposite said first terminus, said first and second terminus openings being connected by a hollow core;
   said male fitting further comprising threads on the outside of said second terminus and on said hollow core surface of said second terminus;
   a locking fitting comprising threads configured to fit in said threads on the hollow core surface of said second terminus to form a single unit; and
   a female fitting comprising threads on the inside of said female fitting whereby the threads of the female fitting are configured to fit over said threads of said male fitting to form a single unit, said female fitting comprising an open end and a closed end, said closed end continuous with a threaded shaft; and
   said female fitting further comprising a locking pin hole configured to accept a locking pin whereby locking said female fitting to said male fitting when said locking pin is inserted, said locking pin hole of said female fitting and said locking pin being threaded so as to screw into said locking pin hole and lock said female fining to said male fitting upon tightening.

5. The safety line replacement kit according to claim 4 wherein said first terminus of said male fitting is narrower than said second terminus.

6. The safety line replacement kit according to claim 5 wherein said male fitting, said female fitting and said locking fining is constructed of material selected form the group consisting of stainless steel, metal alloy, composite, and synthetic high strength material.

7. The safety line replacement kit according to claim 4 wherein said line is selected from the group consisting of monofilament, synthetic lines, and space-age materials.

* * * * *